Feb. 14, 1928.

C. C. HANSEN

AIR LINE OILER

Filed June 9, 1927

1,658,984

INVENTOR.
Charles C. Hansen.
BY
HIS ATTORNEY.

Patented Feb. 14, 1928.

1,658,984

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

AIR-LINE OILER.

Application filed June 9, 1927. Serial No. 197,635.

This invention relates to oilers, but more particularly to an air line oiler adapted to be connected to a hose line leading from a source of pressure fluid supply to a fluid actuated machine, such as a rock drill, air motor or the like.

The objects of the invention are to insure an ample supply of lubricant in a suitable form to the movable parts of a machine through the medium of the pressure fluid whereby the machine is actuated, and to enable substantially the entire supply of lubricant to be exhausted from the reservoir after each filling thereof, thus eliminating the necessity of frequent interruptions in the drilling operation for the purpose of replenishing the supply of oil in the reservoir.

Figure 1:
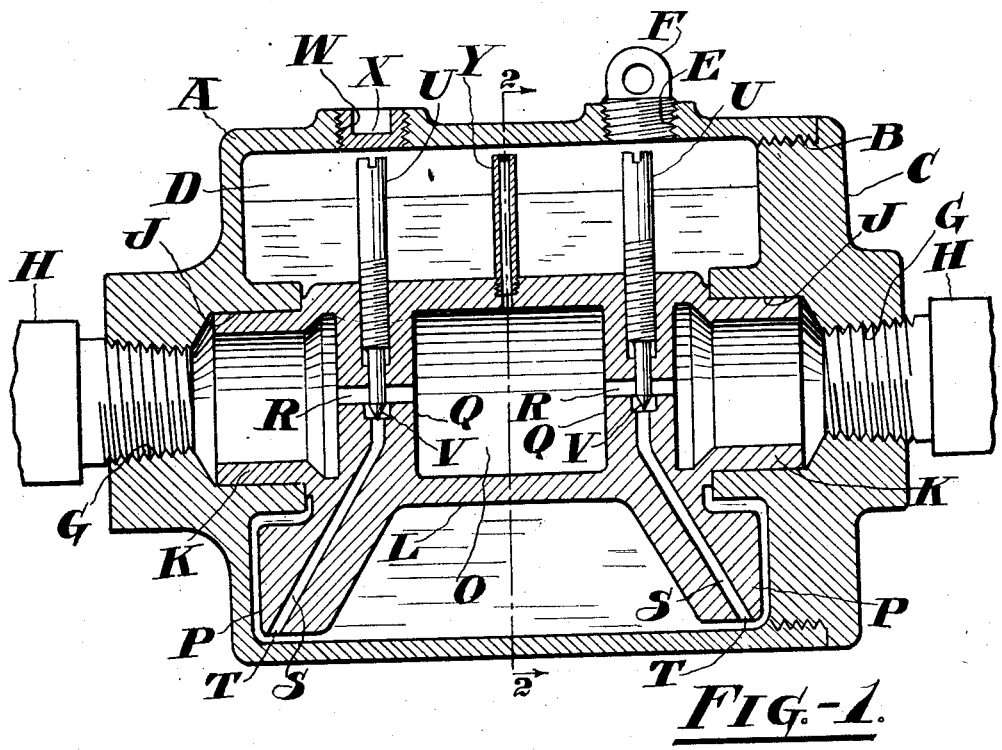
Figure 2:
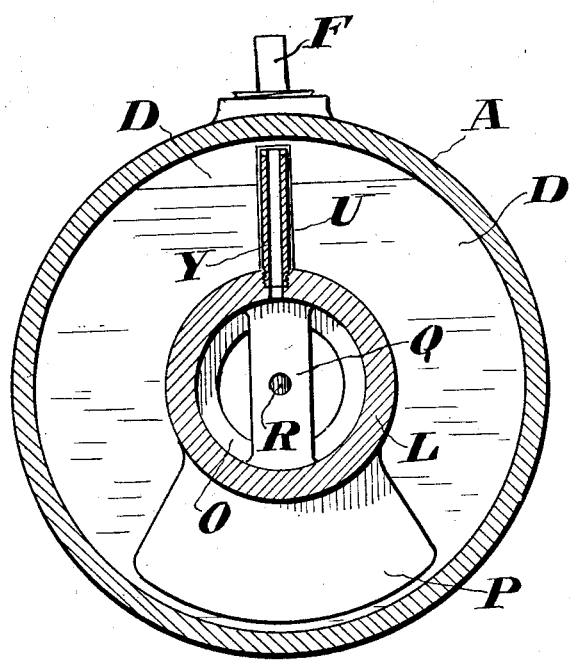

Other objects will appear hereinafter and to all of these ends the invention consists of the combination of elements and arrangement of parts substantially as hereinafter described and claimed and illustrated in the accompanying drawings, in which Figure 1 is a longitudinal sectional elevation of an oiler constructed in accordance with the practice of the invention, and Figure 2 is a transverse view taken through Figure 1 on the line 2—2 looking in the direction indicated by the arrows.

Referring to the drawings, A designates a casing having a threaded aperture B at one end to accommodate a threaded cover C which forms a closure for the end of the casing.

The interior D of the casing forms a reservoir for oil which may be introduced thereinto through a filling opening E which may be sealed in any suitable manner, as for instance, by a threaded plug F.

Both the casing A and the cover C are provided at their ends with threaded apertures G whereby the casing may be connected to sections of a hose line H leading from a source of pressure fluid supply to a machine intended to be actuated by such pressure fluid. The threaded apertures G may be said to be a continuation of bores J formed in the inner ends of the casing and the cover C. The bores J in this instance are of somewhat larger diameter than the threaded apertures G and serve as bearings for reduced ends K of a tubular member L, the interior of which forms a passageway O for pressure fluid flowing from one section of the hose line H to the other. The diameters of the ends K of the tubular member L are preferably such with respect to the bores J that the tubular member may revolve freely relatively to the casing whenever the casing A is shifted about from one position to the other in the course of the work.

In order to insure such relative rotation between the casing A and the tubular member L, said tubular member is provided with weights P formed integrally therewith and preferably located near the junctures of the enlarged portion of the tubular member and its ends K. The weights P are preferably of only sufficient size to insure against rotation of the tubular member L and in this instance are formed to extend to points near the ends of the casing, only sufficient clearance existing between the ends of the casing A and the weights to prevent contact between these elements.

In the interior or passageway O of the tubular member L are formed bridges Q which extend transversely of the passageway O. The bridges Q in this instance are located approximately adjacent the weights P and have passages R therethrough which may, as shown, be coaxial with the passageway O.

Leading from the passages R through the lowermost portions of the bridges Q and through the weights P are passages S, the inlet openings or ports T of which lie near the ends of the casing A so that one or the other of the ports T, or both, will be in communication with the oil as long as there is oil in the reservoir D, irrespective of the angle of inclination of the casing A.

Suitable means are provided for controlling the volume of oil which may be delivered from the reservoir D into the passageway O. To that end, needle valves U which may be of any suitable type are threaded into the bridges Q to extend with their tapered ends V into the outlet openings of the passages S. The needle valves U are accessible for adjustment from the exterior of the casing A, one valve U being located substantially in line with the filling opening E and the other valve U in line with an aperture W in the casing A normally sealed by a plug X.

In order that a constant pressure may be maintained on the surface of the oil in the reservoir D for the purpose of elevating such oil through the passages S, a pipe Y is screwed in the tubular member L, preferably mid-way between the bridges Q and in the same longitudinal plane as the needle valves U. By thus arranging the pipe Y the outlet opening of the pipe will at all times remain in substantially a vertical position and will thus project above the surface of the oil in the reservoir.

The operation of the device is as follows: Upon the admission of pressure fluid into the hose line and the passageway O, a portion of the pressure fluid will flow through the pipe Y into the reservoir D and, acting on the surface of the oil in the reservoir, will tend to raise the oil in the passages S. If then, the machine intended to be lubricated is set in operation, the pulsations occurring in the pressure fluid flowing through the hose line will create a certain unbalancing effect between the pressures in the reservoir and in the passageway O which will elevate the oil in the passages S into the passages R from whence it will be conveyed by the pressure fluid in a suitably atomized state into the machine.

Whenever oil of low viscosity is used or if it be desired to decrease the volume of oil of any grade, the needle valve U may be screwed down to decrease the area of the outlet openings of the passages S. On the other hand, if oil of higher viscosity is being used as a lubricant or if it be desired to increase the volume of oil delivered to the passageway O, the needle valves U may be unscrewed to provide an opening of suitable area for the flow of oil from the passages S into the passages R.

Owing to the provision of weights on the tubular member L, said tubular member will at all times be held in substantially the same position with respect to the vertical and consequently the ports T of the passages S will be in communication with any oil which may exist in the reservoir D.

This apparatus is in some respects a modification of a co-pending application Serial No. 151,126 filed by Charles C. Hansen on November 27, 1926. In the present form, however, two oil lubricant inlet passages S are provided instead of one, as shown in that application.

I claim:

1. An air line oiler, comprising a casing forming a reservoir for oil, said casing having threaded apertures at its ends for connection with an air line, a tubular member supported rotatably by the casing forming a passageway for pressure fluid through the casing, weights carried by the tube extending with their free ends to the ends of the casing, passages in the weights conveying oil from the reservoir into the passageway, said passages having their inlet openings near the ends of the casing, needle valves in the tubular member controlling the outlet openings of the passages, and a pipe carried by the tube conveying pressure fluid from the passageway into the reservoir to act on the surface of the oil for forcing the oil through the passages.

2. An air line oiler, comprising a casing forming a reservoir for oil, said casing having threaded apertures at its ends for connection with an air line, a tubular member journalled at its ends in the casing forming a passageway for pressure fluid through the casing, bridges near opposite ends of the tubular member, weights integral with the tubular member extending with their free ends to the ends of the casing, said weights tending to prevent rotation of the tubular member with the casing, passages in the weights and the bridges conveying oil from the reservoir into the passageway, and needle valves in the bridges controlling the outlet openings of the passages.

In testimony whereof I have signed this specification.

CHARLES C. HANSEN.